United States Patent Office 3,368,456
Patented Feb. 13, 1968

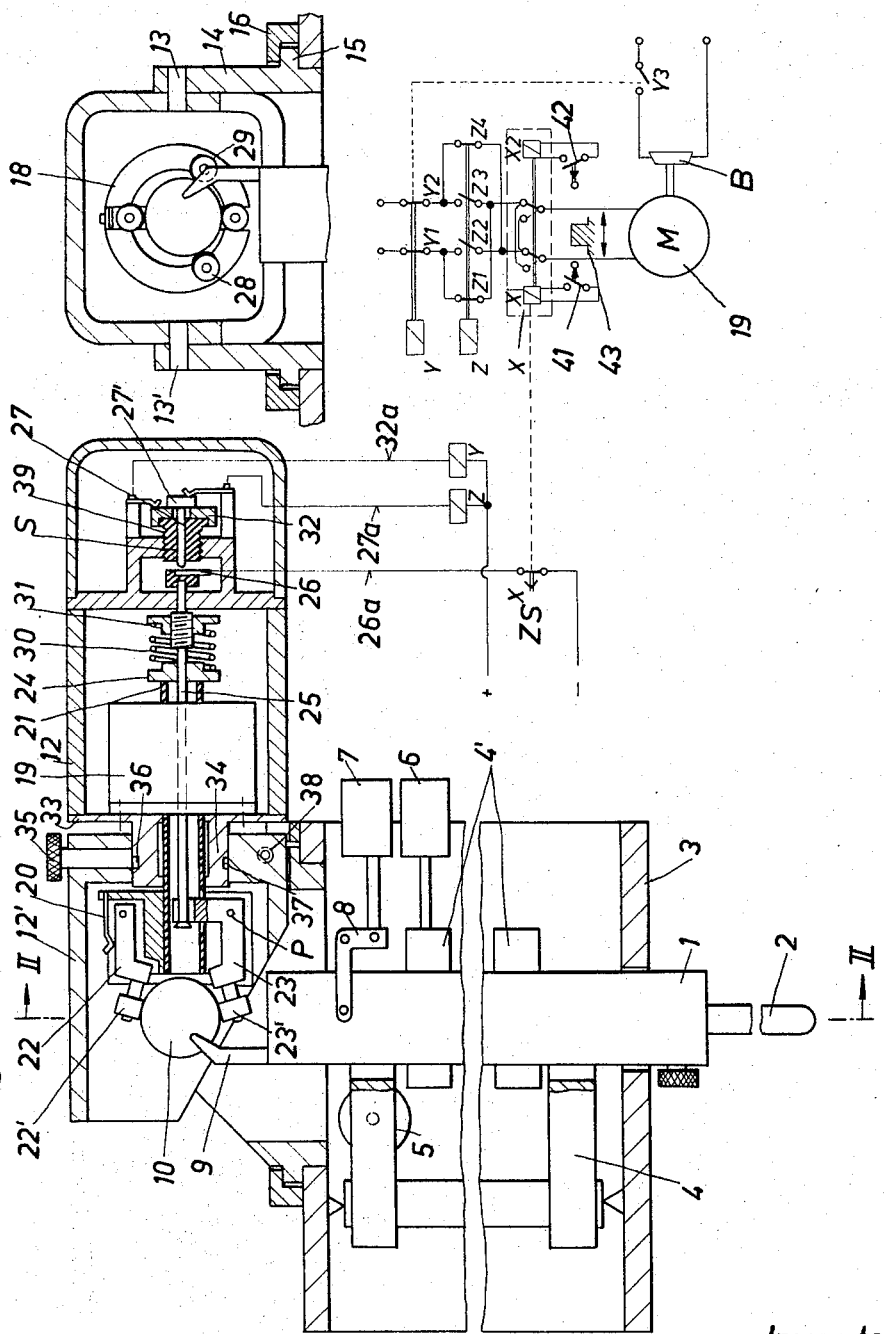

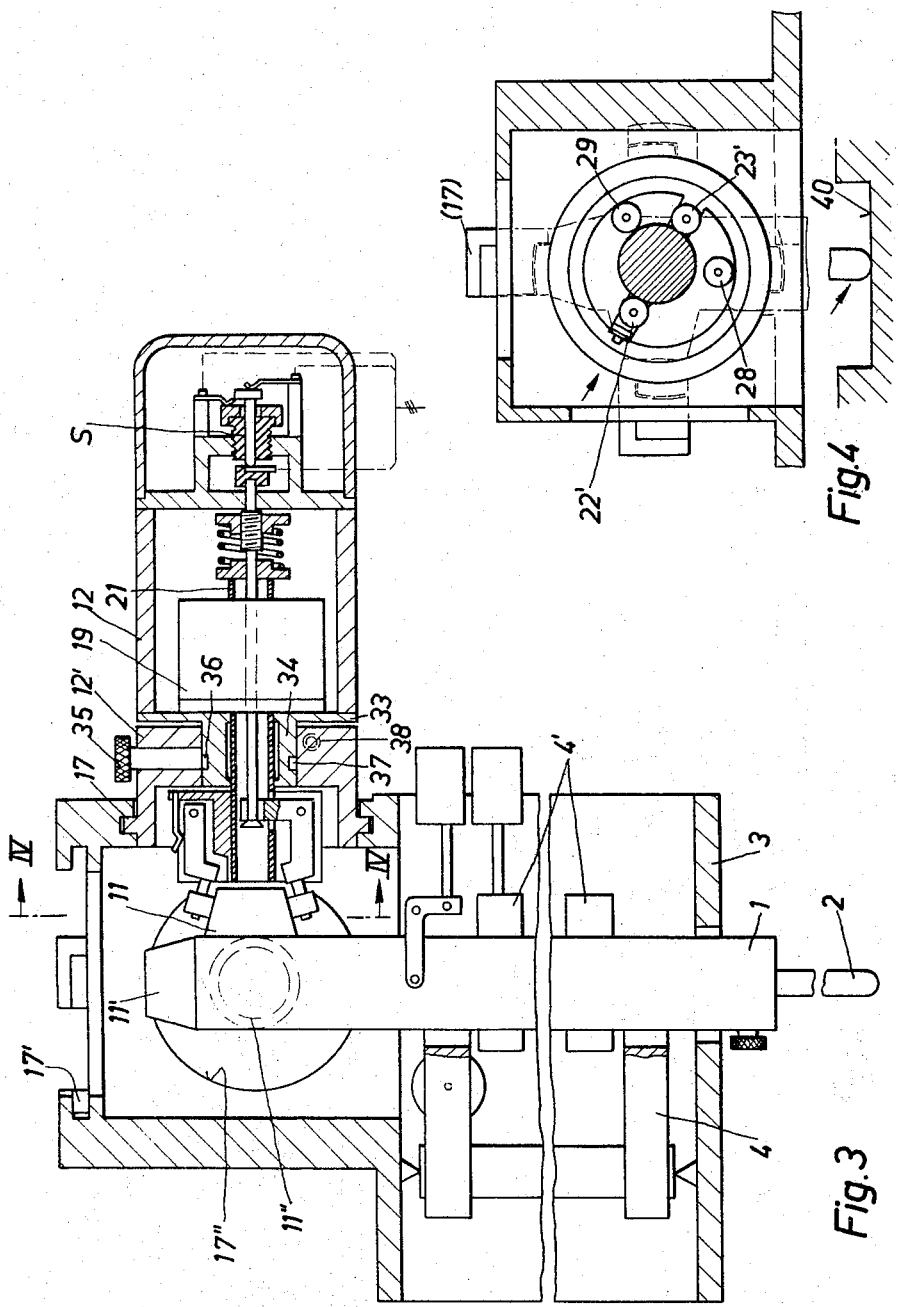

3,368,456
TRACER UNIT FOR DUPLICATING TOOL MACHINES, PARTICULARLY DUPLICATING MILLING MACHINES
Paul Kohl and Georg Schlapp, Frankfurt am Main, Germany, assignors to Nassovia Werkzeugmaschinenfabrik G.m.b.H., Frankfurt am Main, Germany, a corporation of Germany
Filed Dec. 23, 1966, Ser. No. 604,440
Claims priority, application Germany, Dec. 24, 1965, N 27,821
18 Claims. (Cl. 90—62)

ABSTRACT OF THE DISCLOSURE

A duplicating apparatus for following a pattern which includes a separable housing, one portion of which contains a measuring head and a tracer element while the other portion contains a control unit for the head and tracer. The separable housings are arranged for axial movement one relative to the other by a rotatable device which by its movement permits changes in the measuring circle travelled by the head and tracer.

This invention pertains to tracer controlled duplicating machine tools and relates to a tracer particularly for duplicating milling machines which operates on the principle of an advance of the tracer and is on the one hand equipped with an advance control unit which automatically guides the tracer along the model, said tracer being actuated by an advance force depending upon a tangent of contact between the tracer and the model. On the other hand the unit is equipped with an impulse starting mechanism affixed to the tracer rod to initiate the feed motion of one or several tools dependent upon the degree of deflection and direction of the tracer. The advance control unit and the impulse starting mechanism form independent control circuits which are coupled to one another through interaction of a measuring element attached to the upper end of the tracing rod with the clockwise or counterclockwise (with respect to the advance control) rotating measuring head of the advance control unit.

While hydraulic valves, electrical contacts, inductive transmitters and the like affixed to the tracer rod can serve as impulse starting mechanisms in the feed control circuit, advance control units in the advance control circuit have become known which comprise a clockwise or counterclockwise rotatable measuring head driven by an advance control element and a drive motor as a function of the tangent of contact between the tracer and the pattern. This head cooperates with the measuring element and, with the assistance of an advance control force, exerts a continuous pressure upon the measuring element and thereby upon the tracer. This pressure is exerted in a direction which, in the direction of tracing and feed, forms an acute angle with the tangent of contact between the tracer and model. Known tracing devices of this type use as a measuring element either a ball or a ring or several bolts affixed to the upper end of the tracer rod while for an advance control element electrical, hydraulic or pneumatic switches are used.

The measuring head, rotatable in a clockwise or counterclockwise direction with respect to the advance, encircles the measuring element almost always circularly in such a manner that there exists a difference in diameter between an abutment ring or a so-called measuring circle (which is an imaginary circle touching the generatrix of a plurality of abutments) on one hand and the measuring element on the other hand. As a result, the element of the measuring head providing the advance control force continuously urges the measuring element into an eccentric position against the abutment ring or against the imaginary circle formed by the plurality of abutments. This eccentricity causes the advance of the tracer, and its effective magnitude during the tracing process and in the moment of coincidence of the tangent of contact between the tracer and the pattern with the contour of the pattern is a determining factor of the degree of precision of duplication.

On the other hand, there also exists a relationship between the effective magnitude of advance and the speed or rate of feed insofar as to any given effective magnitude of advance there belongs a predetermined range of feed speed. Taking into account the masses to be moved and other factors, within this range an error-free control may be achieved by the impulse transmitters of the feed control circuit and consequently a maximum precision in duplication may be attained. An increase in the feed rate range corresponding to a given effective magnitude of advance requires therefore a corresponding increase of advance while maintaining constant the magnitude of the angle which the direction of the advance control force forms with the tangent of contact between the tracer and the pattern. It is this problem the present invention purports to solve.

There are, to be sure, known tracer units on duplicating milling machines wherein said units have an electromagnetically operated advance control unit comprising a measuring ball affixed to the upper end of the tracer rod and a measuring head encircling the measuring ball and carrying a measuring contact. This measuring head, by means of an advance control force, constantly urges the ball into an eccentric position with relation to the axis of the measuring head and against the support rollers defining the measuring circle. Further, the measuring head is driven by an electric motor through an electromagnetic, reversible clutch clockwise or counterclockwise in the direction of the advance. Although in such an advance control unit the measuring circle and thereby the magnitude of advance are variable by means of making an axial adjustability of the measuring head with respect to the measuring ball, the transmission of impulse from the advance control element (comprising the measuring ball and the measuring contact of the measuring head) to initiate the rotary motion of the measuring head, however, occurs directly through the making or breaking of electrical contacts which occur during touching or separation, respectively, between the measuring ball and the measuring contact. Consequently, constant contact gaps are present which necessarily result in a constant angle which the direction of the advance control force forms with the tangent of contact between the tracer and the pattern. Using this type of an advance control unit there exists a danger of wear of the contact faces due to the direct friction and electrical contact made between the measuring ball and the measuring contact. This, if even only after an extended period, can lead to a change in the contact gaps and thus to an undesired change of the angle which the direction of the advance control force forms with the tangent of contact on the model. It is further disadvantageous in that it requires sliding contacts to transmit the control voltage to the measuring contact rotating with the measuring head.

The invention relates therefore to another type of advance control unit in which no part of the advance control element serves simultaneously as the measuring element (e.g. measuring ball), but in which the advance control element is separate from the measuring element and receives only the mechanically transmitted movements of deflection of the measuring element.

The invention concerns a tracer unit for duplicating machine tools, in particular duplicating milling machines, with an advance control unit in which the measuring element itself is not a component of the advance control element, and the position of which with relation to the measuring element is variable and lockable for the purpose of changing the measuring circle. Further, means are provided which, when such a change in the measuring circle occurs, leaves the transmission of impulse or signal of the advance control element unaffected. To this end, the aforenoted means comprises a pressure element pressing against the measuring element by virture of an adjustably settable force. This pressure element is diametrically coordinated on the measuring head with still another pressure element which is located on the measuring head and urges the measuring element by virtue of an advance control force against the abutments defining the measuring circle. The pressure element urged against the measuring element by the adjustably settable force is operatively connected to the advance control element and transmits the deflections of the tracer to the advance control element. The adjustably settable force of one of the pressure elements forms a counter-force against the advance control force exerted on the measuring element through the other pressure element. This counter-force is always less than the advance control force. By this means it is assured that a change of the measuring circle will not affect the impulse transmitting mechanism of the advance control element.

To define the measuring circle, support members mounted on the measuring head may be provided on either side of the pressure element urged against the measuring element by the adjustably settable force and the pressure elements and the support members may be arranged in a common plane encompassing the measuring element and all lying on the measuring head on a common conical surface. To diminish the forces of friction it is moreover advantageous that the pressure elements and support members be formed as sleeve rollers.

To transmit the motions of deflection of the measuring element (located on the tracer rod) to the advance control element, a connecting member may be used, such as an angle lever pivotally held in the measuring head. This lever carries the pressure element submitted to the adjustably settable force. The advance control element may, nevertheless, directly engage this pressure element.

The advance control unit of the invention may comprise as a measuring element a ball or three or more frusto-conical bodies or a conical collar. As an advance control element a hydraulic, pneumatic or electrical switch may be used wherein the control faces or contact gaps, respectively, of the advance control element are adjustably settable for changing the angle which the direction of the advance control force (which guides the tracer stylus automatically along the pattern) forms with the tangent of contact between the stylus and the pattern.

The pressure element submitted to the adjustably settable force is advantageously affixed to one end of the angle lever, the other end of which extends into a hollow shaft that drives the measuring head. This pressure element is connected with a rod that extends longitudinally within the hollow shaft. This rod carries a spring element pressing against the measuring head and an axially adjustable member which limits the spring path and serves for the setting of this spring force. The free end of this rod is connected to the advance control element, for example, the actuating element of an electrical switch. The free end of this rod may be connected e.g. to the piston of a hydraulic valve which forms the advance control element. Through actuation of the adjusting member for setting the spring force which represents a counter-force against the advance control force, the advance control force itself may thus be indirectly varied.

According to still another embodiment of the invention, the pressure element operating under the adjustably settable force may be affixed to one end of the angle lever, the other end of which is butted against a spring biased piston of a hydraulic valve located inside the measuring head preferably radial to the axis thereof.

In all instances the advance control unit is so constructed that it is held axially displaceable with respect to the measuring element and may be secured in any desired position. This constructional feature can be achieved according to a further characteristic of the invention in the following manner: The tubular shaft is rotatably held by its outer circumference between the measuring head and the drive motor in that portion of the divided housing of the advance control unit which surrounds the drive motor (driving the measuring head) and the advance control element. Further, the flange type bearing structure of this portion of the housing is axially displaceably held with respect to the other portion of the divided housing. This other portion is connected to the tracer housing in a rotatable and pivotable or re-pluggable manner and, as an adjusting element for axial displacement is provided, for example, with an annular groove into which extends an actuating element (such as a rotatable eccentric bolt) passing from the outside through the other housing portion.

In case of an advance control unit that has a hydraulic switch as an advance control element, the measuring head may be provided with a cylindrical block which encloses the hydraulic conduits for the valve. The block is axially displaceably and rotatably held in the housing of the advance control unit. This latter housing is connected in a rotatable, pivotable or re-pluggable manner with the tracer housing. The block further has radial hydraulic discharge ports that communicate with radial conduits in the housing and further also has, as an adjusting element for axial adjustment, an annular groove into which extends an actuating element (such as a manually rotatable eccentric bolt) passing through the housing of the advance control unit. For initiating the rotary motion of the measuring head, the cylindrical block is operatively connected to the drive shaft of a motor securely anchored to the housing.

The invention, furthermore, can be used to advantage with all advance control units, as, for example, with an advance control unit which has an advance control element that initiates the clockwise or counterclockwise rotary driving motion of the measuring circle either from a standstill or from a continuously oscillating motion when there is a deviation of the model contour from the tangent of contact (tracer deflections). The driving of the measuring head for the initiation of this rotary motion may be achieved by means of a motor with an electromagnetic, reversible clutch, or by a "rotation-reversible" electrical or hydraulic motor. The invention is described in the ensuing specification with the aid of several embodiments taken in conjunction with the drawing wherein:

FIG. 1 is a partial cross-sectional view and partial elevational view of one embodiment of the invention together with a diagrammatic showing of the circuitry involved;

FIG. 2 is a cross-sectional view on line II—II of FIG. 1;

FIG. 3 is a partial cross-sectional and partial elevational view of another embodiment of the invention;

FIG. 4 is a cross-sectional view on line IV—IV of FIG. 3;

Figures 5, 6:
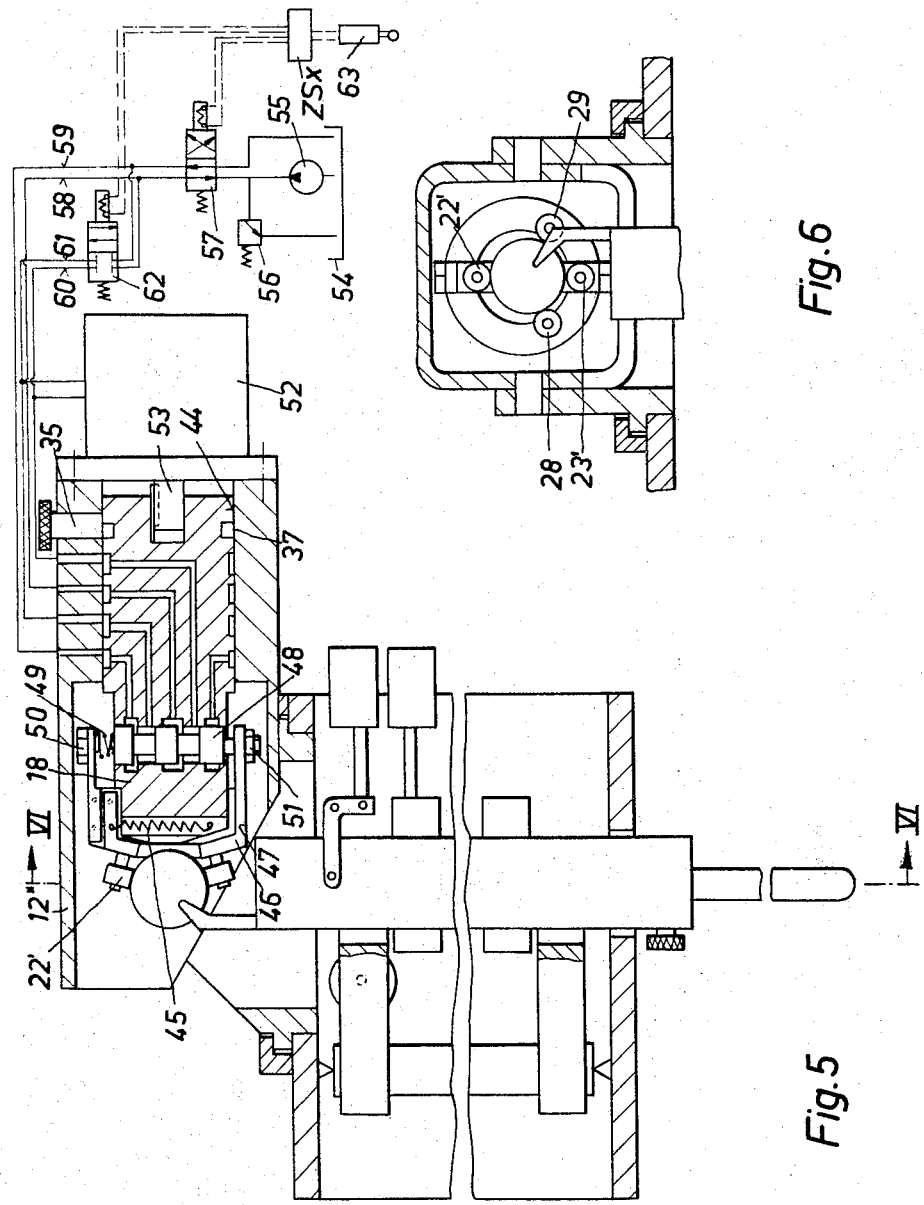
FIG. 5 is a partial cross-sectional and partial elevational view of still another embodiment of the invention also showing diagrammatically the flow control system therefore.
FIG. 6 is a cross-sectional view on line VI—VI of FIG. 5.

In FIGS. 1–4 there are depicted two types of tracer devices of duplicating milling machines with electrically operated advance control units which in their construction differ in essence only in the choice of different measuring elements on the tracer rod 1. The tracer rod with its tracing stylus 2 is held in tracer housing 3 by means of bifurcated levers 4 and 4' and is deflectable in any direction. To said levers there are coupled hydraulic control valves 5 and 6 for initiation of the feed motion of the carriages carrying the tool and tracer or workpiece and model in both horizontal directions of motion, that is, either "longitudinally" or "transversally." An additional control valve 7 for the initiation of vertical feed motion is connected to the tracer rod by an angular crank arm or lever 8.

Instead of a bifurcated joint for the tracing rod allowing parallel tracer stylus deflection, obviously one may use also a tracer rod mounted by means of a ball joint and swingable over an angle range about the center of the ball without changing the scope of the invention. The same holds true for the selection of impulse starters on the tracer rod for initiation of feed motions. These, for example, can also be made of electrical contacts, electrical transmitters or other similar elements.

On the upper end of the tracer rod 1 in the embodiment according to FIGS. 1 and 2 a spherical measuring element 10 is secured in such a manner to the arm 9 that its center coincides with the axis of the tracer. The measuring element 10 (or 11 in the embodiment of the invention shown in FIG. 3) cooperates with and is in engagement with an advance control unit allowing for automatic duplication milling. The advance control unit is housed in a separated housing consisting of the elements 12 and 12'.

According to the embodiment of FIGS. 1 and 2 the advance control unit is, for the setting for contour milling, with its housing section 12' with trunnions 13, 13' journaled swivelably about the sphere center in a bifurcated bearing block 14 and may be locked in any desired angular position. Further, the advance control is, for the setting for linear milling, rotatable about the tracer axis (for changing the direction of tracing) with the aid of the bearing block 14 which journals by means of flange 15 in a guide 16 provided on the tracer housing and may be locked in any angular position by means not shown. These setting means make possible a tracing and a duplication milling by the line-by-line process in the "longitudinal" or "transverse" line direction and in any other selectable line direction in the horizontal direction and also in the so-called slanted line direction.

Moreover, the tracer rod 1 with the aid of locking means, not represented in detail in each instance, is indexed in the direction of the line feed adjustment so that in the direction in which the line feed occurs, the tracer rod cannot be deflected. These methods are already known in the art and do not form any part of this invention, but are referred to for a better understanding of the functioning of the tracer unit.

According to the embodiments of FIGS. 3 and 4, the advance control unit is re-pluggable by means of the housing section 12' in the three spatial direction (longitudinal, transverse and vertical). In each said direction there are disposed frusto-conical body members 11, 11' and 11", respectively. The advance control unit is lockable in a bayonet-fashion in the corresponding recesses 17, 17' and 17" of the tracer housing 3. The adjustment (setting) of the advance control unit shown in FIGS. 1 and 3 corresponds thereby to a tracing direction of the transverse line method if the plane of the drawing is seen as when standing in front of the device, while a rotation, i.e. re-plugging of the advance control unit to an angle of 90° perpendicular to the plane of the drawing represents an adjustment for line-by-line milling in the longitudinal direction and a swiveling i.e. re-plugging to a 90° angle in the plane of drawing in a perpendicular position represents the setting for contour of peripheral milling.

The advance control unit essentially comprises a measuring head 18 (see FIG. 2) enclosing measuring elements 10, 11 (FIGS. 1 and 3, respectively), an electric motor 19 which rotates the measuring head clockwise or counterclockwise in the direction of the advance control, a spring 20 which produces the force for the advance control, and an electric switch S which is an advance control element initiating the rotary motion of the electric motor as a function of the tangent of contact between the tracer and the pattern. The measuring head 18 is directly fastened to the hollow motor shaft 21, and carries in a radial recess a crank-shaped lever 22 swingable about a pivot point P. The measuring head 18 further carries a substantially bellcrank-shaped lever 23 located diametrically opposite to lever 22 and similarly thereto, is disposed in a radial recess of the measuring head 18 and is pivotable about another point P. One end of bellcrank lever 23 extends into the hollow shaft 21 where it is coupled with an axially displaceable rod 25 guided in a flange-like bearing 24 that closes off the end of the hollow shaft 21. Rod 25 is operatively connected through an insulated electrical contact 26, attached to its free end, with an actuating element 27 of electrical switch S. On the ends of both levers 22 and 23 which are pointed toward the frontal face of the measuring head, there is mounted a freely rotating thrust roller 22' and 23', respectively, both of which engage the measuring element 10, (11 of FIG. 3) at an angle of about 15° to the axis of the measuring head and in such a manner that the faces of contact lie on the same conical surface.

Mounted on both sides of thrust roller 23' there are two other freely rotatable support rollers 28 and 29 which are each arranged on a common circle at an interval of about 90° on the frontal face of the measuring head. The imaginary circle touching the surface of these rollers forms the so-called measuring circle. This measuring circle has a diameter which is larger than the diameter of the measuring element by twice the value of the advance. A pressure spring 30 engages an annular surface of bearing 24 and with its other end presses against the annular surface of an adjusting nut 31 threadedly and axially adjustably mounted on rod 25. Due to this arrangement, there is a counter-force created against the advance control force produced by the spring 20. This counter-force which acts upon the measuring element through bellcrank lever 23, must nevertheless always be smaller than the advance control force so that roller 22' can continuously bring the measuring element into an eccentric position with respect to the measuring head i.e., into the advance position and thus bring the actuating element 27 of the electrical switch to its greatest position of deflection during idling (no contact with the pattern). With the actuating element 27 in this position, contacts 27' and 32 are open. With the aid of the nut 31 the counter-force against the advance control force and thereby indirectly the magnitude of the advance control force may be varied. The electric motor 19 is mounted (in a manner not shown in detail) on a flange-type closure 33 of housing section 12. The closure possesses a hub 34 which with its center bore forms a slide bearing for the motor shaft 21 and which by its outer circumference is mounted axially adjustably, in housing section 12'. The axial adjustment of housing 12 can be undertaken with the aid of a freely rotatable bolt 35 positioned in a bore in housing section 12'. The end of this bolt carries an eccentric 36 which extends into an annular groove 37 in the outer circumference of hub 34. With a turn of this bolt 35, the housing section 12 shifts, together with the advance control unit with the measuring head in the axial direction of the unit. A lock screw 38, not shown in detail, serves to lock the measuring head in any desired position with relation to the measuring element subsequent to adjustment by bolt 35.

As already mentioned, according to FIGURES 1–4, an electric switch S is provided as an advance control element. This switch has two switching positions for starting the clockwise or counterclockwise rotation of the motor 19 which drives the measuring head and a base position in which contacts 26, 27, 27' and 32 of the switch are closed and no rotary motion of the measuring head occurs. It is self-evident that any other switch with another switching characteristic can be used insofar as it is capable of initiating the rotation of the measuring head. The electrical switch is insulated from the housing section 12 of the advance control unit and screwed into it by means of a threaded bushing 39. The switch is secured against accidental turning by a pin screw (not shown). When the pin screw is loosened, the bushing 39 can be axially displaced by turning. By means of this adjustment, the contact gaps 26, 27, 27', 32 of the switch may be varied and thereby the degree of the angle formed by the direction of the advance control force with the tangent of contact between the tracer and model during the duplicating milling process may be changed.

The simplified switching scheme in FIGURE 1 shows the operation of the electric switch for the measuring head drive. Accordingly, contact 26 is connected by conductor 26a to the negative pole of a direct current source through a time switch ZSX, while the contact 27, 27' is connected by conductor 27a to the positive pole through relay Z and the contact 32 is connected to the same positive pole by conductor 32a through relay Y. In the switching positions shown in FIG. 1, contacts 26, 27 are open and the contacts 27', 32 are closed by spring action. Such a contact position corresponds to the largest deflection of the tracer and in which the measuring element exhibits the greatest eccentricity to the measuring circle and rests on both support rollers 28, 29. If the tracer stylus 2 with this position of the measuring head, makes no contact with the pattern, then the advance control unit is in the idling tracing position, that is, the measuring head is driven by motor 19 in a direction whereby the measuring element and the tracer stylus in FIGS. 1 and 3 make a circular motion perpendicular to the plane of the drawing. It is assumed that in this idling position the measuring head rotates clockwise. At this time, the relay Y has dropped and is unenergized and its contacts Y1, Y2 are closed while Y3 is open. It is to be noted that Y3 is in a supplementary power circuit for actuating an only symbolically shown brake assembly B for motor 19. This brake assembly may electromechanically engage the motor shaft 21 or may operate directly through the motor winding in a known manner. The relay Z has also dropped whereby its contacts Z1 and Z4 are closed and Z2 and Z3 are open. To this contact position corresponds, as already mentioned, a clockwise rotation of the motor M and the measuring head. When the tracer stylus is brought from its idling position into contact with the contour of a model 40 (FIG. 4) manually or by some other undefined mechanical or electrical means, it is deflected axially to its motion of advance. When this occurs, the measuring element 10 (11 of FIG. 3) that is securely fastened to the tracer rod, makes a like deflection and loses contact with one of the two support rollers. Since pressure roller 23', urged by spring 30 follows this deflection, this deflecting motion will be transmitted via rod 25 to the switch S. Consequently, contacts 26, 27 close (FIG. 3) whereby the electrical switch assumes its basic position in which all of its contacts are closed. At this instant the tangent of contact between tracer and pattern coincides with the pattern contour. The relay Y is energized whereby its contacts Y1, Y2 open and Y3 closes. The electrical current for motor M19 is cut off and the brake B is actuated by the closing of contact Y3 so that the rotation of the motor and thereby that of the measuring head is stopped. The relay Z is likewise energized whereby its contacts Z1, Z4 open and Z2, Z3 close. Thus, the conductors have been crossed for the reversal of the direction of rotation of motor M. The measuring element is now deflected inside the measuring circle by the magnitude of the effective advance and rests on one support roller. The measuring element is pressed against support roller 29 by the advance control force 20, 22' at an acute angle to the tracing surface in the tracing direction in FIGS. 1 and 3, perpendicular to the plane of the drawing; and in FIG. 4 in the direction of the arrow. The deflection of the tracer rod to the extent of the effective advance slightly opens a hydraulic valve—for example, valve 5—and controls the corresponding feed motion of the work carriage or tool carriage in a "transverse" direction. As soon as the tracer stylus is axially deflected by a rise in the model contour, contacts 32, 27' of switch S open. When this occurs, relay Y is again de-energized and closes its contacts Y1, Y2 and opens its contact Y3. Because relay Z remains energized and the brake B of the motor 19 is de-energized, the motor begins to turn the measuring head in a counterclockwise direction. This continues until the direction of the advance control force has again reached the previously mentioned angle to the tangent of contact between the tracer stylus and the pattern. At this moment, the switch S has again assumed its basic position in which all of its contacts are closed. The motor and measuring head are again at a standstill and remain so as long as the pattern contour coincides with the tangent of contact and does not change. To reverse the feed motion within the line direction there are limit switches mounted on the machine column for each direction of motion. For example, there are provided limit switches 41, 42 which can be activated by a cam 43 affixed to the corresponding machine carriage which carries out the feed motion. The limit switches initiate the reversal of the rotation of motor 19 through magnetic switches X1, X2 in conjunction with a time switch ZSX. If the tracer head carriage rides against one of the end switches, then the time switch ZSX having delayed closing characteristics, simultaneously opens and energizes one of the two magnetic switches X1, X2, causing a drop of relay Z which would lead to a clockwise rotation of the motor but which is avoided by the simultaneous reversal of the motor terminals by switch X so that counterclockwise rotation is achieved.

Hence the motor and measuring head rotate in a counterclockwise direction until the measuring head has assumed a position in which the direction of the advance control force points in the opposite direction to the pertinent line direction just scanned. In this position, the time switch ZSX again closes its contact and the measuring head automatically sets itself again in the advance position in which the direction of the advance control force again forms the desired angle with the tangent of contact between tracer and model. It is now, however, operative in the opposite direction. It is to be understood that in place of relays, transistors or any other switching means may be used to control the rotary motion of the measuring head.

In FIGS. 5 and 6 there is shown a further embodiment of the invention including a hydraulically operated advance control unit. For parts identical to those in FIGS. 1–4 the same reference symbols have been retained. In this embodiment the measuring head 18 is constructed both as a valve block of a hydraulic valve and, in its extension, as a bearing flange by means of which it is held rotatably or if needed, axially displaceable at 44 in housing 12" of the advance control unit. The measuring head carries, in the same manner as in the foregoing embodiments, a pressure roller 22' urged against measuring element 10 with an advance control force provided by tension spring 45 (20 in FIG. 1) and another pressure roller 23' affixed to an angle lever 46 and disposed diametrically on the measuring head and adjoined on both sides by support rollers 28, 29.

The angle lever 46, fulcrumed at pivot point 47, rests its free end opposite the measuring head on control piston 48 of the hydraulic valve. The other end of the piston is constantly held in contact with the angle lever by a pressure spring 49 attached to the measuring head. The pressure spring 49 exerts, once again, a counter-force against the advance control force produced by spring 45 and is variable by means of set screw 50. The magnitude of the advance control force may thus be set indirectly and variably. The contact surface of the angle lever 46 with the control piston is formed by an adjustable lock screw 51 with which, during its adjusting, the position of the control faces of the hydraulic valve may be changed and thereby may be varied the angle which the direction of the advance control force forms with the tangent of contact between the tracer and model during the tracing process. The measuring head is driven by a shaft 53 of a hydraulic motor 52 flange-mounted to the housing 12''.

In the hydraulic switching diagram there is shown a liquid container or sump 54 from which the pressure liquid is fed by means of a liquid pump 55 through a pressure limit valve 56 to a hydraulic, magnetically operable two-way direction reversing valve 57. The valve 57, in its operation, corresponds to relay Z in the electrically operated advance control unit according to FIGS. 1–4. Two conduits 58, 59 lead from valve 57 through annular channels and corresponding conduits in the measuring head to control piston 48. Two additional conduits 60, 61 branch off from conduits 58, 59 and lead through another magnetically operated two-way opening valve 62 to the motor 52 and to control piston 48. The valve 62 corresponds to the relay Y in FIG. 1 and is electrically connected to a time switch ZSX which is switched by the limit switches 63 actuated by the work carriages of the machine and which produces the like effect in reversing the line of direction as described in connection with FIGS. 1–4.

According to FIGS. 5 and 6, the measuring head is in the idling position, that is, the tracer stylus does not make contact with the pattern. Thus, from pump 55, liquid is fed through conduit 58 to piston 48 which by virtue of the advance control force exerted upon the measuring element assumes its position of greatest deflection. From piston 48 the liquid flows through conduit 60 to the hydraulic motor from where the liquid flows back into container 54 through conduit 61, valve 62, and conduit 59. It is now assumed that the hydraulic motor is rotating in a clockwise direction. The measuring head is driven in the same direction and the measuring element moves circularly with its greatest eccentricity in the measuring circle. If the tracer stylus is moved towards a model manually or automatically and during its downward movement contacts the pattern, it is axially deflected relative to its direction of movement and transmits this deflection with the aid of measuring element 10 and angle lever 46 to control piston 48. This piston moves downward in the plane of the drawing and closes all the control faces. In this basic position of the hydraulic valve, the flow of liquid to the motor 52 is interrupted, the motor does not rotate and the measuring head stands still. Through the deflection of the tracer rod as a consequence of advance, the tracer stylus is automatically guided along, for example, a model contour in a straight line. If the tracer rides on a rising model contour, it will be forced still farther back in an axial direction whereupon the piston shifts still farther down and the pressure liquid now flows through conduit 58 to piston 48; and from there through conduit 61 to the hydromotor and subsequently through conduits 60 and 59 back to the container 54. The hydromotor and the measuring head are now turning in a counterclockwise direction and continue to do so until the direction of the advance control force has again assumed the selected angle to the tangent of contact on the model.

To change the measuring circle and thereby the effective advance of the tracer, the measuring head in this embodiment can also be axially displaced with respect to the measuring element. For this purpose, there is provided on the flange-like structure of the measuring head an annular groove 37 into which extends an eccentrically constructed end of a bolt 35 which is rotatably mounted in housing 12'' of the advance control unit and which may be locked by means not shown in detail. It will now be understood that by turning bolt 35 in accordance with all the embodiments in FIGS. 1–6 the measuring head 18 is displaced, under the eccentric effect of the bolt, together with the housing section 12 of the advance control unit (FIGS. 1–4) in the direction of its axis whereby the diameter difference between any given effective diameter of the measuring element and the diameter of the imaginary circle formed by the support (bearing) rolls 28, 29 may be changed. This corresponds to a change in the size of the measuring circle and thus in the magnitude of the effective advance. The displacement of the measuring head should only be undertaken when the machine is idling (no contact with the pattern) because pressure roller 22' operating under pressure from advance control force 20 keeps the measuring element in constant contact with support rollers 28, 29. Thereby the position of pressure roller 23' with respect to the measuring element and operating under pressure of counter-force 30 and 48, respectively, as well as the position of angle lever 23 and 47, respectively, and with them the contact gaps of the electric switch S, as well as the control face positions of hydraulic control piston 48 remain constantly unchanged. Consequently, despite the desired change in the advance, the angle which the direction of the advance control force forms during the tracing process with the tangent of contact between the tracer and pattern, always remains the same size. After an axial displacement of the measuring head has taken place, it can be locked in its new position against turning by a locking screw applied at 38 but not shown in detail or by one of the bolts 35.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a duplicating machine tool having a tracer adapted to follow a pattern, a measuring element mounted on said tracer, an advance control unit having a detachable measuring head rotatably engageable with said element for forcing said tracer in constant engagement with the pattern and automatically determining the advance direction as a function of the contact tangent between the tracer and pattern, first means in said measuring head for transmitting signals to control means for rotating said head clockwise or counterclockwise as soon as the pattern contour deviates from the contact tangent and for stopping rotation when the contact tangent corresponds with the pattern contour, said first means including diametrically disposed pressure element means in said head and being urged against said measuring element by spring means for producing an advance force by actuating said first means for rotating said head in either direction or into a neutral position for stopping the rotation, support member means on each side of said pressure element means to restrict movement of said measuring element and for placing said first means in neutral position when either support member means engages said measuring element, and second means adapted to disengage the advance control unit from the measuring head.

2. In a duplicating machine tool according to claim 1, wherein said second means is adapted to move the advance control unit axially with the measuring head to thereby modify the circular path or measuring circle travelled by said measuring element.

3. In a duplicating mechine tool according to claim 1, wherein the pressure element means and the support member means are provided with sleeve rollers.

4. In a duplicating machine tool according to claim 1, wherein the pressure element means include shaft means, said shaft means having sleeve rollers revolubly secured thereto, said shaft means supporting said sleeve rollers in divergent contacting relation relative to said pressure element.

5. In a duplicating machine tool according to claim 1, wherein at least one of said diametrically disposed pressure element means is urged into contact with said measuring element by leaf spring means.

6. In a duplicating machine tool according to claim 1, wherein an adjustable spring means is provided for variably counteracting said advance control force.

7. In a duplicating machine tool according to claim 1, wherein said means for rotating said head includes a reversible electric motor means.

8. In a duplicating machine tool according to claim 1, wherein a sectional housing is provided for the measuring head and the advance control unit, said housing being adjustably mounted in a guide means.

9. In a duplicating machine tool according to claim 1, wherein the advance control unit comprises hydraulically actuated motor means.

10. In a duplicating machine tool according to claim 9, wherein the advance control unit includes a control piston mechanically connectesd to the measuring element.

11. In a duplicating machine tool according to claim 10, wherein the pressure element means are adapted to cooperate with said control piston.

12. In a duplicating machine tool according to claim 10, wherein at least one of the pressure element means includes means adapted to engage said control piston.

13. In a duplicating machine tool according to claim 12, wherein another of said pressure element means is urged into contact with said control piston by a spring means.

14. In a duplicating machine tool according to claim 13, wherein a spring means is interposed between said control piston and said pressure element means.

15. In a duplicating machine tool according to claim 13, wherein set screw means are adapted for adjusting the pressure of said spring means.

16. In a duplicating machine tool according to claim 1, wherein said measuring element comprises a ball.

17. In a duplicating machine tool according to claim 1, wherein said measuring element comprises at least three frusto-conical body members.

18. In a duplicating machine tool according to claim 9, further including electrically actuated switch means adapted for controlling fluid flow through the motor means.

References Cited
UNITED STATES PATENTS

| | | | |
|---|---|---|---|
| 2,796,806 | 6/1957 | Schlapp | 90—62 |
| 3,241,455 | 3/1966 | Kohl | 90—62 |

GERALD A. DOST, *Primary Examiner.*